(12) United States Patent
McLaughlin et al.

(10) Patent No.: US 10,693,307 B2
(45) Date of Patent: Jun. 23, 2020

(54) THREE PHASE CHARGER ACCOMMODATING WIDE INPUT VOLTAGE RANGE WITH FLEXIBLE SINGLE PHASE INPUT OPTIONS

(71) Applicant: VOLVO TRUCK CORPORATION, Göteborg (SE)

(72) Inventors: James McLaughlin, Greensboro, NC (US); Amrita Rane, Greensboro, NC (US); Julien Richer, Lyons (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 502 days.

(21) Appl. No.: 15/537,458

(22) PCT Filed: Dec. 22, 2014

(86) PCT No.: PCT/US2014/071904
§ 371 (c)(1),
(2) Date: Jun. 19, 2017

(87) PCT Pub. No.: WO2016/105343
PCT Pub. Date: Jun. 30, 2016

(65) Prior Publication Data
US 2018/0041061 A1    Feb. 8, 2018

(51) Int. Cl.
*H02J 7/00* (2006.01)
*H02J 7/02* (2016.01)
(Continued)

(52) U.S. Cl.
CPC ............... *H02J 7/02* (2013.01); *B60L 53/20* (2019.02); *H02J 7/022* (2013.01); *H02M 1/10* (2013.01); *B60L 2210/30* (2013.01); *H02M 7/06* (2013.01)

(58) Field of Classification Search
CPC ......... H02J 7/0055; H02J 7/022; B60L 53/20; B60L 2210/30; H02M 1/10; H02M 7/06
(Continued)

(56) References Cited

U.S. PATENT DOCUMENTS

| 4,143,414 A | 3/1979 | Brewster et al. |
| 5,959,857 A | 9/1999 | Nagahara |

(Continued)

FOREIGN PATENT DOCUMENTS

CN    101030736 A    9/2007

OTHER PUBLICATIONS

Notifiation of First Office Action for Chinese Patent Application No. 201480084302.X, dated Feb. 22, 2019, 22 pages.
(Continued)

*Primary Examiner* — Nathaniel R Pelton
(74) *Attorney, Agent, or Firm* — Withrow & Terranova, PLLC

(57) ABSTRACT

A system for charging a battery from various three phase or single phase grid supply voltages includes a full wave bridge rectifier for receiving the AC supply voltage, two DC to DC converters for receiving unregulated DC output voltage from the rectifier, a first switch connected to a first input line of a first one of the two converters and a second switch connected to a first input line of a second one of the two converters, wherein each of the switches is set to a first position when the supply voltage is at a lower one of the varying voltage levels and to a second position when the supply voltage is at a higher one of the varying voltage levels.

11 Claims, 9 Drawing Sheets

(51) Int. Cl.
  *H02M 1/10* (2006.01)
  *B60L 53/20* (2019.01)
  *H02M 7/06* (2006.01)
(58) Field of Classification Search
  USPC ........................................................ 320/109
  See application file for complete search history.

(56) References Cited

U.S. PATENT DOCUMENTS

| | | | |
|---|---|---|---|
| 6,373,735 B2 * | 4/2002 | Usui | H02M 1/4225 |
| | | | 323/222 |
| 2005/0270806 A1 | 12/2005 | Zhu | |
| 2007/0058401 A1 | 3/2007 | Tan et al. | |
| 2007/0165433 A1 | 7/2007 | Katooka et al. | |
| 2009/0021081 A1 | 1/2009 | Jacobson et al. | |
| 2012/0158245 A1 | 6/2012 | Yoshizawa et al. | |
| 2012/0280662 A1 * | 11/2012 | Krauer | H02J 7/04 |
| | | | 320/138 |
| 2013/0134935 A1 * | 5/2013 | Maitra | B60L 53/11 |
| | | | 320/109 |
| 2013/0314038 A1 | 11/2013 | Kardoius et al. | |
| 2014/0217974 A1 | 8/2014 | Kim et al. | |
| 2014/0361742 A1 | 12/2014 | Chung et al. | |

OTHER PUBLICATIONS

Extended European Search Report for Corresponding Application.
International Search Report and Written Opinion (dated Mar. 26, 2015) for corresponding International App. PCT/US2014/071904.

* cited by examiner

THREE PHASE CHARGER ACCOMMODATING WIDE INPUT VOLTAGE RANGE WITH FLEXIBLE SINGLE PHASE INPUT OPTIONS

BACKGROUND

The present disclosure relates generally to battery chargers for electric vehicles and more particularly to chargers that must perform with a range of supply voltages.

A typical circuit for charging the large traction battery in an EV from the AC supply may be similar to that illustrated in FIG. 1, with input filtering omitted. Charging circuit 100 includes a six diode full wave bridge rectifier 150 (with no connection to neutral) that feeds a single DC to DC converter 180. The DC to DC converter 180 converts the voltage from the rectifier 150 to that needed to charge the traction battery. The voltage needed to charge the battery varies over a significant range as the battery charges from 0% state of charge to 100% state of charge. This range may span a ratio of 1.6 to 1 for example.

Charger 100 of FIG. 1 may be sufficient when no variation in input voltage from the grid is expected, such as in Europe, where three phase 230/400 VAC (Wye/Delta) is commonly available and high power single phase is not common. In some European jurisdictions, high power single phase electricity is not allowed while it is common in the United States.

Electric Vehicle (EV) battery charging from high power three phase utility voltages in the Americas encounters a range of supply voltages and input topologies. In the United States for example, the supply voltages can be 480/277 volts (Delta/Wye) three phase, 208/120 volts three phase or 240 volts "split phase" (single phase with center tap to neutral).

The typical EV battery charger 100 of FIG. 1 offers rated power at the highest supported input voltage with a linear decrease as the input voltage decreases. A 11 kW charger at 480/230 volts input might provide less than 5 kW at 208/120 input for example. This is due, in part, to the fact that it must deal with AC input voltage variation in addition to the DC output voltage variation as the battery charges.

The standard three-phase charging connector (IEC 62196 and SAE J3068) is often used in passenger car applications with only single-phase wiring. In this case, power is supplied between the pins for line 1 and neutral. If such a connection is supplied to the charger of FIG. 1, no power flows since this charger does not make use of the neutral connection. This incompatibility is illustrated in FIG. 2 which shows only one connection to the three-phase charger when a typical single-phase supply connection is used. This inflexibility is a serious limitation to the charger, as such single-phase connections through a three-phase connector are common.

In order to handle such variation of the input voltage while maintaining reasonable output power, current ratings of all the components used in the charging circuit can be increased. However, higher current rating increases the cost of the components.

Another approach may include changing the circuit from one that implements an inexpensive boost converter topology to one that implements a more expensive buck-boost topology. Input voltage variation are less of a problem at low power such as that used in laptop computer power supplies which must operate at different voltages in different countries. It becomes prohibitively expensive as power ratings exceed 10 kW.

Alternatively, three independent isolated battery chargers can be used to improve performance over a wide input voltage range. This single phase charger trio is connected either in a Delta topology for low-input-voltage ranges or in a Wye topology for high input voltages.

In a known system, such as that illustrated in FIG. 3, a charging device 300 includes three independent, isolated chargers 315, 325 and 335 (which are illustrated as AC/DC converters) with one input of each converter connected to phases 310, 320 and 330 respectively of a three phase grid supply. The other input of converters 315, 325 and 335 are connected to switches 318, 328 and 338 respectively. The switches can either be in position A or in position B, depending on the grid supply voltage.

The grid supply transformer secondary is configured in Wye topology. The assumption is that the converter inputs can accommodate an input voltage range between 208 VAC and 277 VAC nominal. The switches can also be implemented as jumpers with different settings for different market regions if individual products are not expected to encounter varying supply voltages thus enabling one device to serve various markets with a simple jumper change.

If the supply voltage is 208/120 VAC, each of switches 318, 328 and 338 should be set to the corresponding "A" position for best efficiency. In this setting, each of the converters is connected in delta (or A) topology to the three phase supply. Converter 315 is connected between grid supply phases 310 and 330, converter 325 is connected between grid supply phases 320 and 310, and converter 335 is connected between grid supply phases 330 and 320. Each of the converters 315, 325 and 335 therefore, sees an input voltage of 208 VAC.

If the supply voltage is 480/277 VAC, switches 318, 328 and 338 have to be set to the corresponding "B" position (as position "A" would present an over-voltage input condition). In this setting, each of the converters is connected between one phase of the three phase grid supply and to a neutral line 340. This is known as Wye (or Star) topology. Each converter 315, 325 and 335 sees an input voltage of 277 VAC.

The voltage range from 208 VAC to 480 VAC represents a ratio of 2.3 (480÷208 or 277÷120). This indicates that a charging circuit such as FIG. 1 has to handle a variation range of 130% if it must work with both 208/120 and 480/277 VAC supplies.

Using the circuit of FIG. 3, the voltage that needs to be handled ranges from 208 VAC to 277 VAC which is a ratio of 1.3 (277÷208). The converters 315, 325 and 335, therefore, see an input voltage increase of 30% when changing from 208/120 to 480/277 grid supplies with the benefit of the prior art in FIG. 3, versus a voltage increase of 130% without this topology change as seen in FIG. 1.

A single phase 240 VAC supply can also be used with the three charger system of FIG. 3, yielding good performance. As illustrated in FIG. 4, charging device 400 is connected to a single phase 240 VAC supply 410 via an adapter 405. Switches 418, 428 and 438 corresponding to converters 415, 425 and 435 are set to the "B" position. Converters 415, 425 and 435 each see an input voltage of 240 VAC (Position "A" is not used with the single phase adapter 405, as position A would present zero volts to the converter inputs).

Power at 240 VAC single-phase input is potentially about 87% (240÷277) of the 480/277 VAC three-phase case. Even if a single phase input adapter only connects to one of the three input phases (as might be the case if "Electric Vehicle Supply Equipment" for single phase passenger EV is connected), charging device 400 can still supply potentially one third of maximum rated power. This overcomes the limitations of the charging circuit 200 of FIG. 2.

While heavy commercial EVs primarily need the higher power afforded by three phase charging connections such as SAE J3068, the ability to take advantage of the significant installed base of single phase public SAE J1772 charging points adds significant value in many use cases. As of the end of 2014, over twenty thousand public J1772 single charging points are available, while there are as yet no J3068 three phase charging points as the J3068 standard is still under development.

The use of the conventional three chargers, however, is potentially costly and a more economical solution is desirable, especially if it retains flexibility in accommodating wide input voltage ranges and accommodating various single phase input topologies.

SUMMARY

According to an exemplary embodiment, a system for charging a battery from a three phase grid supply AC voltage wherein the grid supply supplies varying voltage levels is disclosed. The system comprises: a full wave bridge rectifier for converting the supply AC voltage to unregulated DC voltage; two isolated DC to DC converters for converting unregulated DC voltage from the rectifier to regulated DC voltage for charging the battery; a first switch connected to a first input line of a first one of the two converters; and a second switch connected to a first input line of a second one of the two converters, wherein each of the switches is set: to a first position when the supply voltage is at a lower one of the varying voltage levels; and to a second position when the supply voltage is at a higher one of the varying voltage level.

According to another exemplary embodiment, a method for charging an electric vehicle battery from an AC supply voltage having a varying voltage level is disclosed. The method comprises the steps of: determining the voltage of the connected grid supply power; positioning a pair of switches in one of two positions in accordance with the determined supply voltage; and charging the vehicle battery using the available supply voltage wherein the switches are each connected to a respective first input line of a pair of DC to DC converters that receive unregulated DC voltage from a full wave bridge rectifier that converts AC voltage to unregulated DC voltage. The switches are in a first position when the AC supply voltage is at a lower one of the varying voltage levels and in a second position when the supply voltage is at a higher one of the varying voltage levels.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the exemplary embodiments.

For example, filtering of the AC input power to reduce distortion is not shown. In practice, active switches often replace passive diodes and reactive components are added to comply with power quality requirements, but are omitted here as they do not contribute to the concept.

Reference throughout this specification to an "exemplary embodiment" or "exemplary embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments described herein.

Exemplary embodiments disclose a charging circuit for handling a wide range of three phase grid supply voltages with DC to DC converters that handle a smaller range of input voltages from a full wave bridge rectifier with access to a neutral connection.

Figure 5:
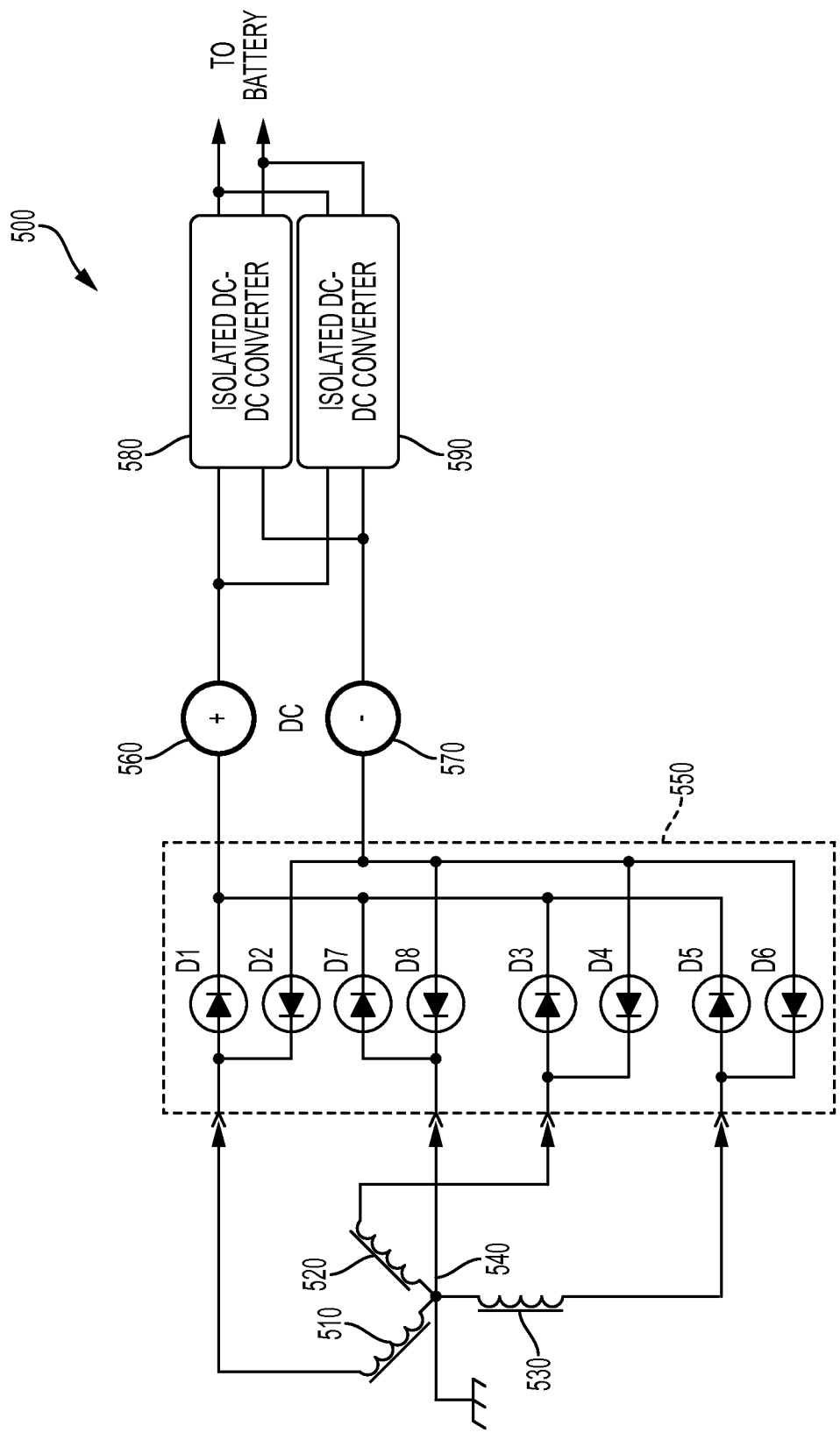
FIG. 5 illustrates a charging system for a three phase grid supply of low voltage in accordance with exemplary embodiments.

A charging device in accordance with exemplary embodiments for a low voltage input is illustrated in FIG. 5. Low voltage input in this context may refer to three phase 208/120 VAC.

Charging device 500 may include a full wave bridge rectifier 550 formed by diodes D1, D2, D3, D4, D5 and D6 (D1-D6). Rectifier 550 may be connected to a grid supply having three phases 510, 520 and 530 and to neutral 540. The phase voltages may be input to rectifier 550. A positive DC voltage 560 and negative DC voltage 570 may be output from rectifier 550.

Diodes D7 and D8 are also included for providing fault tolerance and flexibility in a three phase setting. If, for example, two of the AC input phases fail, diodes D7 and D8 can carry all of the current from the grid supply and provide continued operation although at reduced power. In a normal operating situation (i.e. when none of the three phases are down), small harmonic currents that may exist may be carried by D7 and D8.

Converters 580 and 590 may operate with inputs in parallel. The positive and negative DC voltages 560 and 570 may be provided as inputs to each of the isolated DC to DC converters 580 and 590.

Each of the three phases may provide 120 VAC (RMS value with respect to neutral) to rectifier 550 with the first phase 510 providing 120 VAC at 0°, the second phase 520 providing 120 VAC at 120° and the third phase 530 providing 120 VAC at 240°. This results in an output, from rectifier 550, of approximately ±162 VDC Average with respect to neutral (120*3*√2)/(π) or approximately 170 VDC Peak (120*√2). Each of the DC to DC converters 580 and 590 may see an average input voltage of approximately 324 VDC (162 VDC*2).

Figure 6:
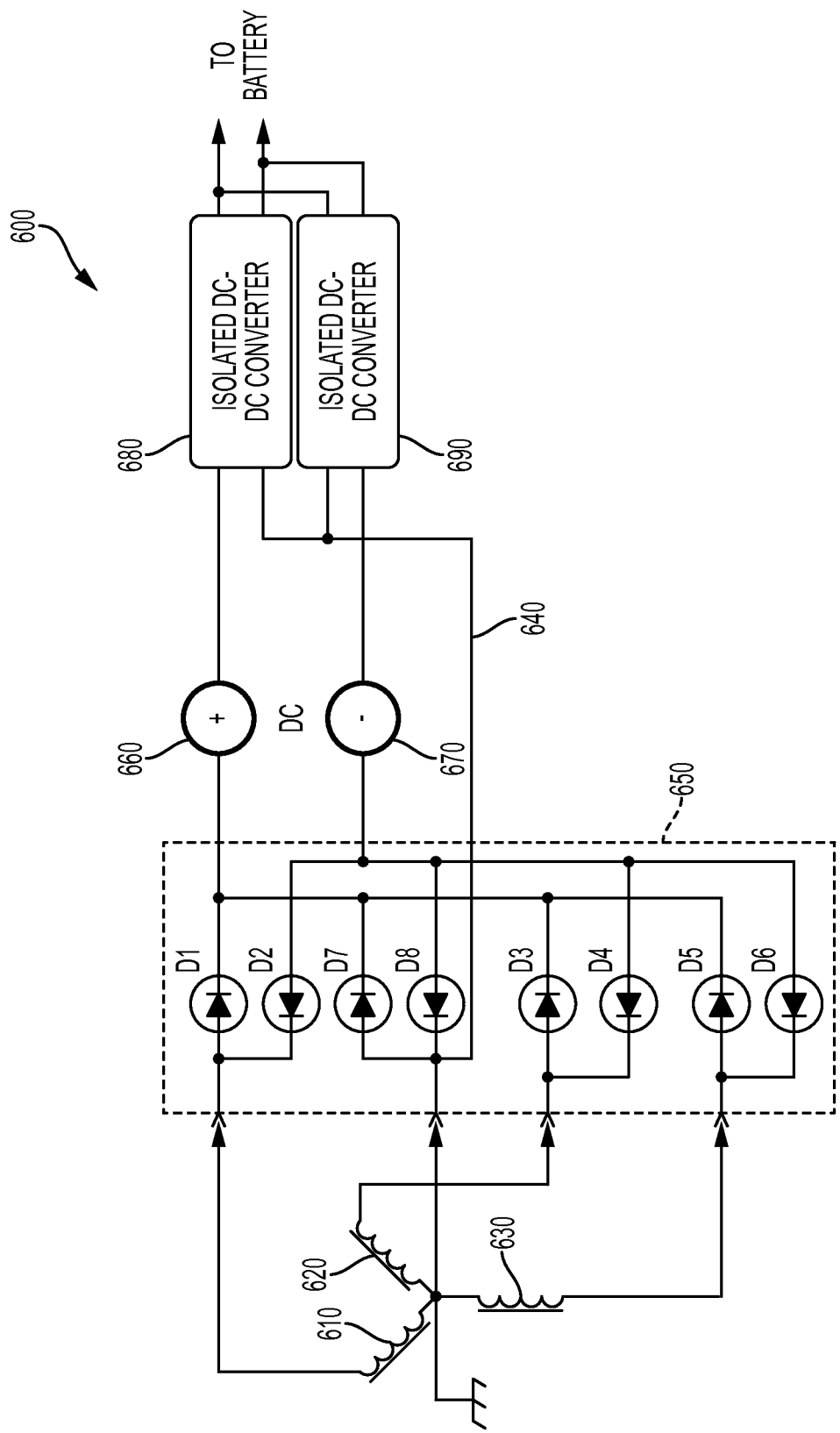
FIG. 6 illustrates a charging system for a three phase grid supply of high voltage in accordance with exemplary embodiments.

A charging device in accordance with exemplary embodiments for a high voltage input is illustrated in FIG. 6. High voltage input in this context may refer to 480/277 VAC.

Charging device 600 may include a full wave bridge rectifier 650 formed by diodes D1 to D6. Rectifier 650 may be connected to a grid supply having three phases 610, 620 and 630 and to neutral 640. The phase voltages may be input to rectifier 650. A positive DC voltage 660 and negative DC voltage 670 may be output from rectifier 650. The function of diodes D7 and D8 have been described above with respect to FIG. 5.

Converter 680 may operate with inputs between positive DC voltage 660 and neutral 640, and converter 690 may operate with inputs between negative DC voltage 670 and neutral 640.

Each of the three phases provides 277 VAC (RMS value with respect to neutral) to rectifier 650 with the first phase 610 providing 277 VAC at 0°, the second phase 620 providing 277 VAC at 120° and the third phase 630 providing 277 VAC at 240°. This results in an output, from rectifier 650, of approximately 374.1 VDC Average (277*3*√2)/(π) or approximately 392 VDC peak (277*√2). Each of the converters 680 and 690 may see an average input voltage magnitude of approximately 374.1 VDC.

Figure 1:
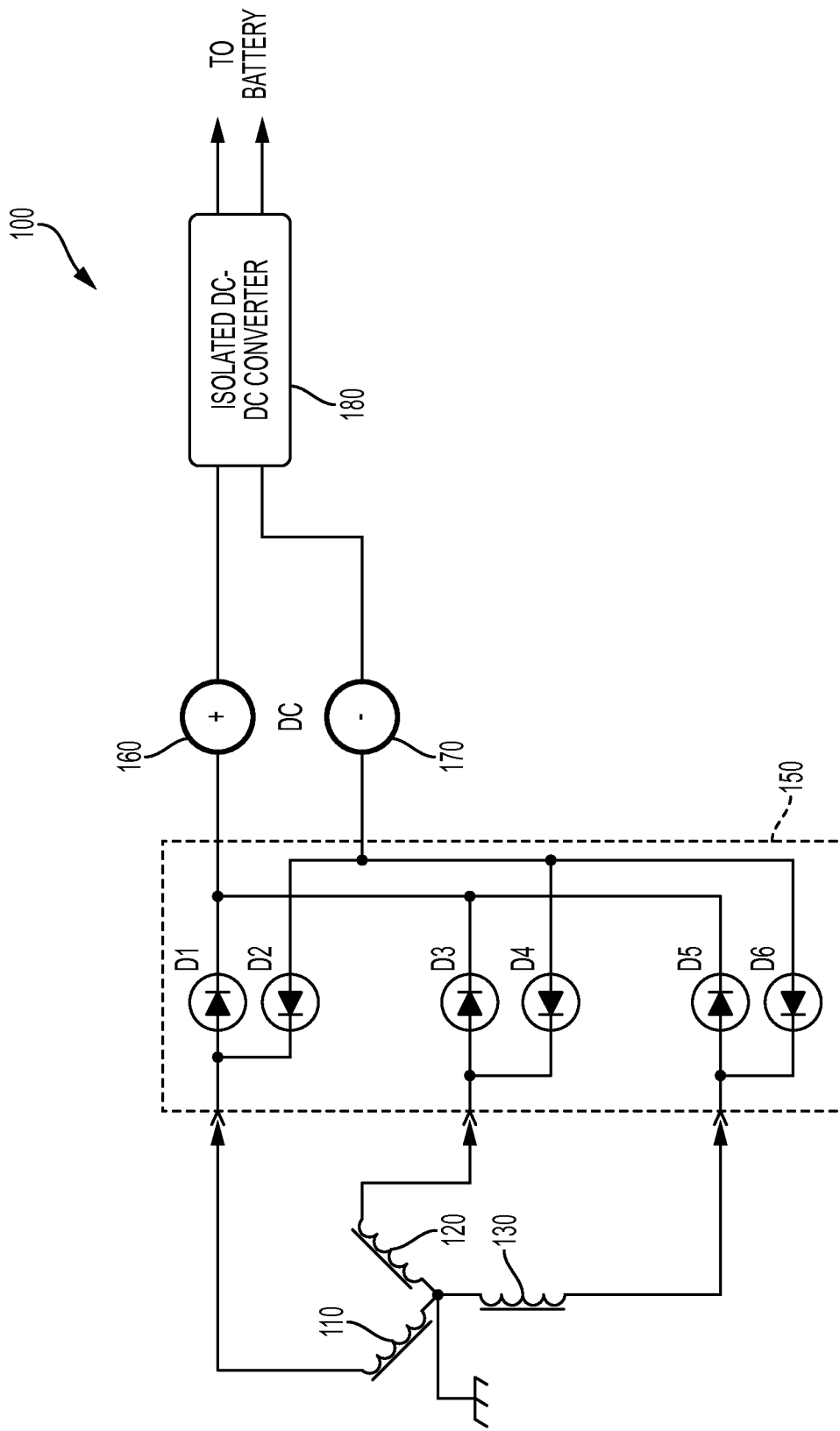
FIG. 1 illustrates a prior art charging circuit for a three phase grid supply voltage.
Figure 2:
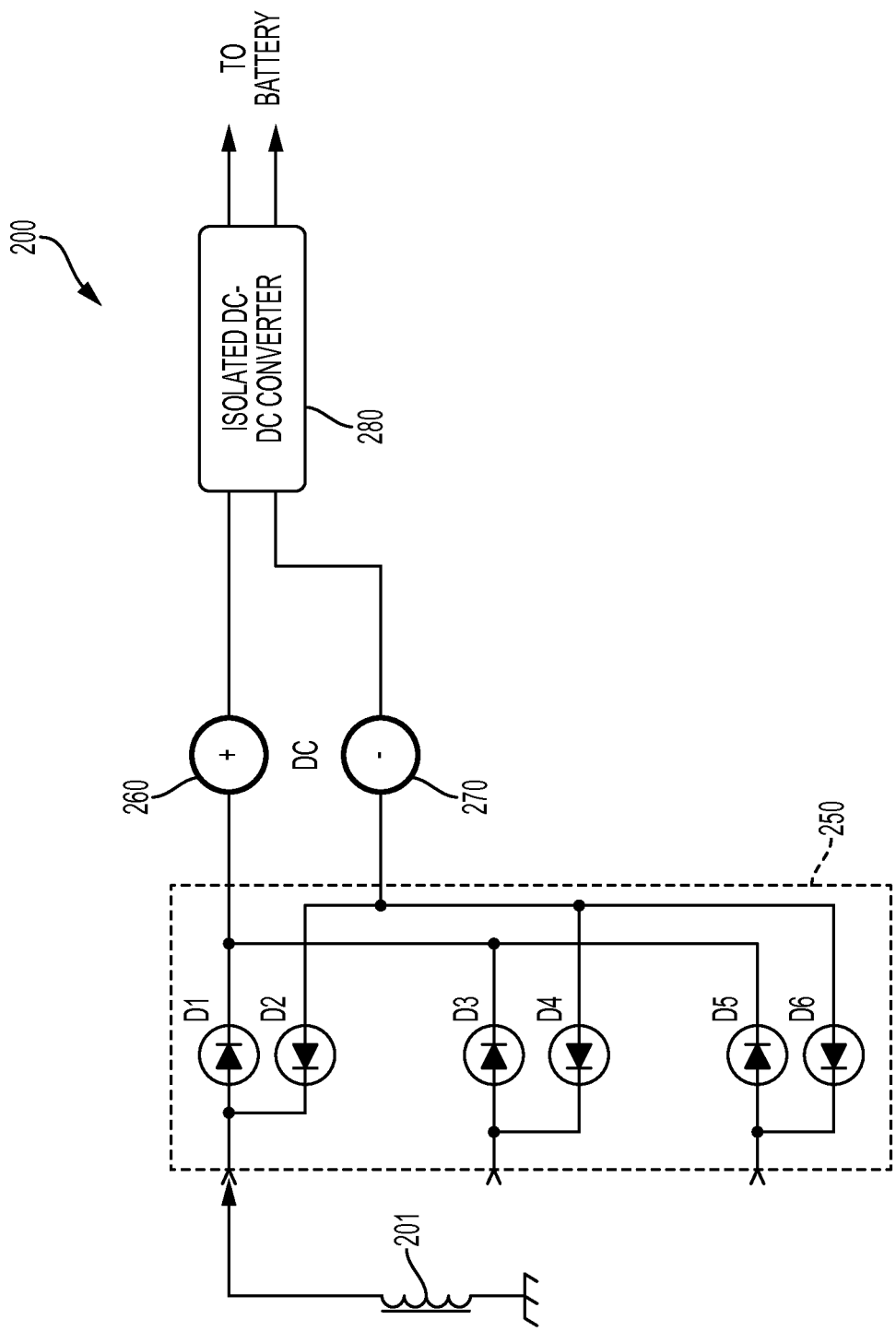
FIG. 2 illustrates the inflexibility of the circuit of FIG. 1 when connected to a common single-phase input topology.
Figure 3:
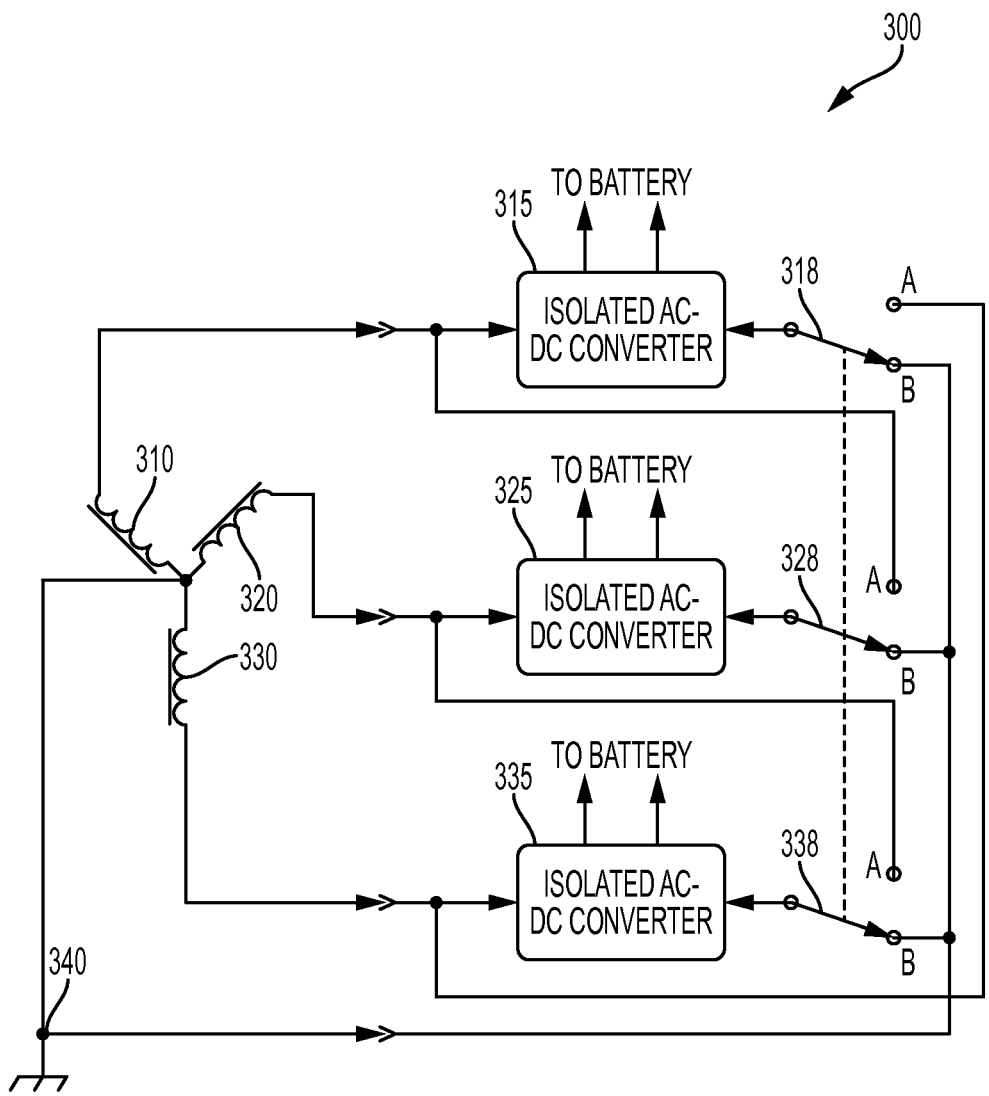
FIG. 3 illustrates a prior art charging system with multiple chargers for a three phase grid supply voltage which improves upon the performance of the charger of FIG. 1.

Each of the converters 580 and 590 in FIG. 5 (and corresponding converters 680 and 690 in FIG. 6) needs to handle a VDC average range between approximately 324 VDC and approximately 374.1 VDC. The ratio of the input voltages is approximately 1.15 (i.e. 374.1÷324). The DC to DC converters of FIG. 5 and FIG. 6, therefore, see an input voltage range of 15% as opposed to the AC to DC converters of FIG. 3 seeing an input voltage range of 30%, or an improvement by a factor of 2.

Figure 7:
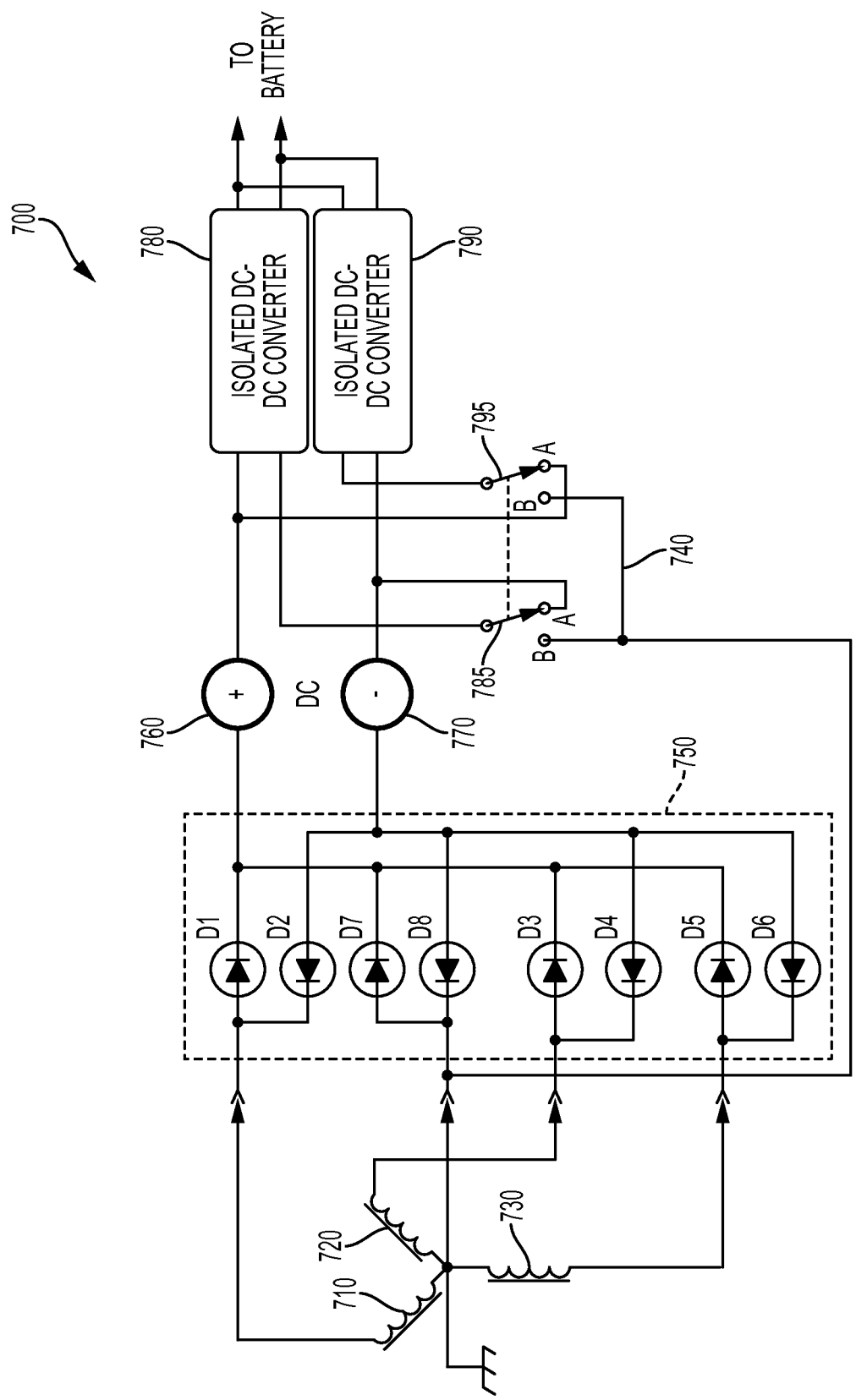
FIG. 7 illustrates a charging system for a three phase grid supply of low or high voltage in accordance with exemplary embodiments.

While the low voltage (208/120 VAC) and high voltage (480/277 VAC) implementations are illustrated separately in FIG. 5 and FIG. 6, a single charging device in accordance with exemplary embodiments that can handle both low and high voltage applications as illustrated in FIG. 7.

In addition to other components illustrated in chargers 500 and 600 of FIG. 5 and FIG. 6 respectively, charging device 700 may include switches 785 and 795. Switch 785 may correspond to DC to DC converter 780 switch 795 may correspond to DC to DC converter 790. Each switch may be at position A or at position B depending on the input voltage level.

For an input voltage of 208/120 VAC (low voltage), the switches may be at position A. In position A, the inputs of both converters 580 and 590 may be connected between the positive and negative DC voltages 560 and 570 (for a magnitude of 324 VDC). The low voltage implementation is similar to charging device 500 of FIG. 5 described above.

For an input voltage of 480/277 VAC (high voltage), the switches may be at position B. In position B, the input of converter 580 may be connected between positive DC voltage 560 (of 374.1 VDC) and neutral, while the input of converter 590 may be connected between negative DC voltage 570 (of −374.1 VDC) and neutral. Therefore, both isolated converters see an average input voltage magnitude of 374.1 VDC. The high voltage implementation is similar to charging device 600 of FIG. 6 described above. The function of diodes D7 and D8 have been described above with respect to FIG. 5.

As with converters 580 and 590 of FIG. 5 and converters 680 and 690 of FIG. 6, each of converters 780 and 790 of FIG. 7 needs to handle a VDC average range between approximately 324 VDC and approximately 374.1 VDC. The ratio of the input voltages is approximately 1.15 (i.e. 374.1÷324). Converters 780 and 790, therefore, also see an input voltage range of 15% as opposed to 30% achieved by existing systems illustrated in FIG. 3 or an improvement by a factor of 2.

Figure 4:
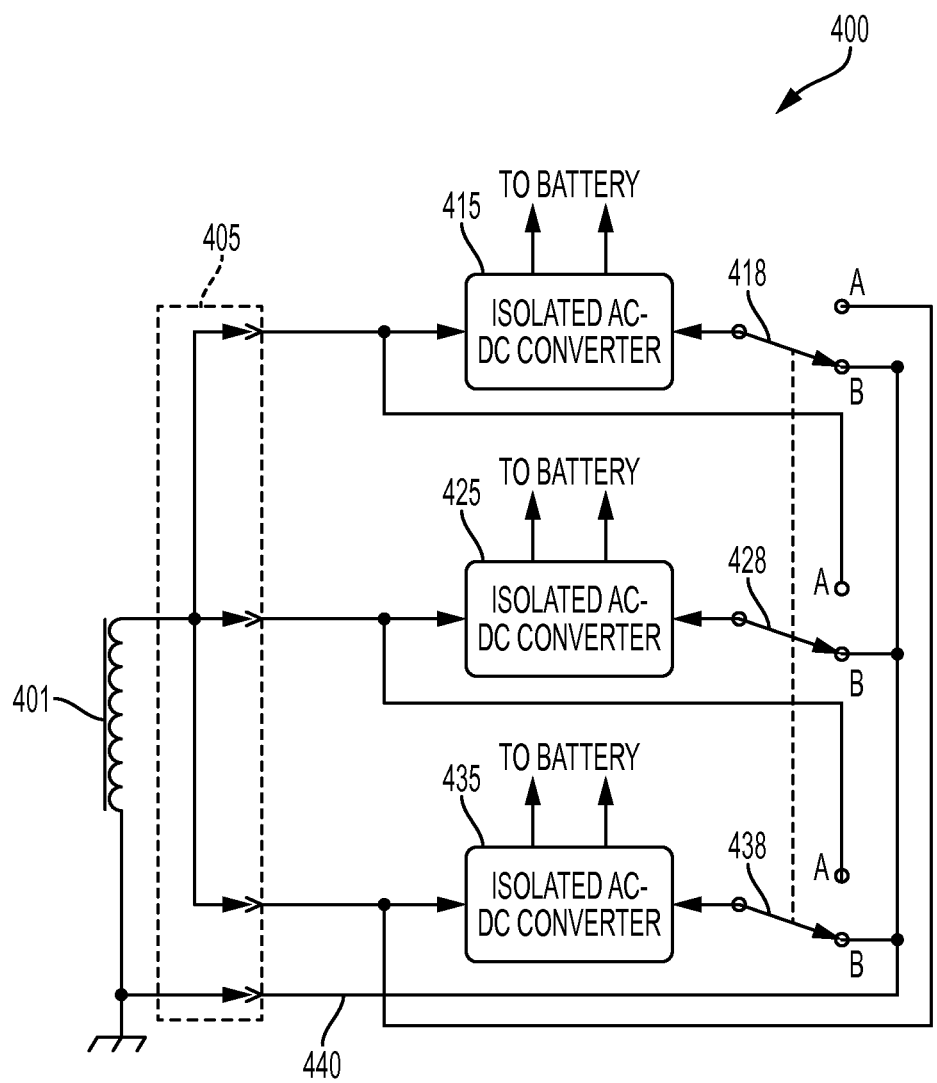
FIG. 4 illustrates a prior art charging system with multiple chargers for a single phase grid supply voltage which improves upon the performance of the charger of FIG. 2.
Figure 8:
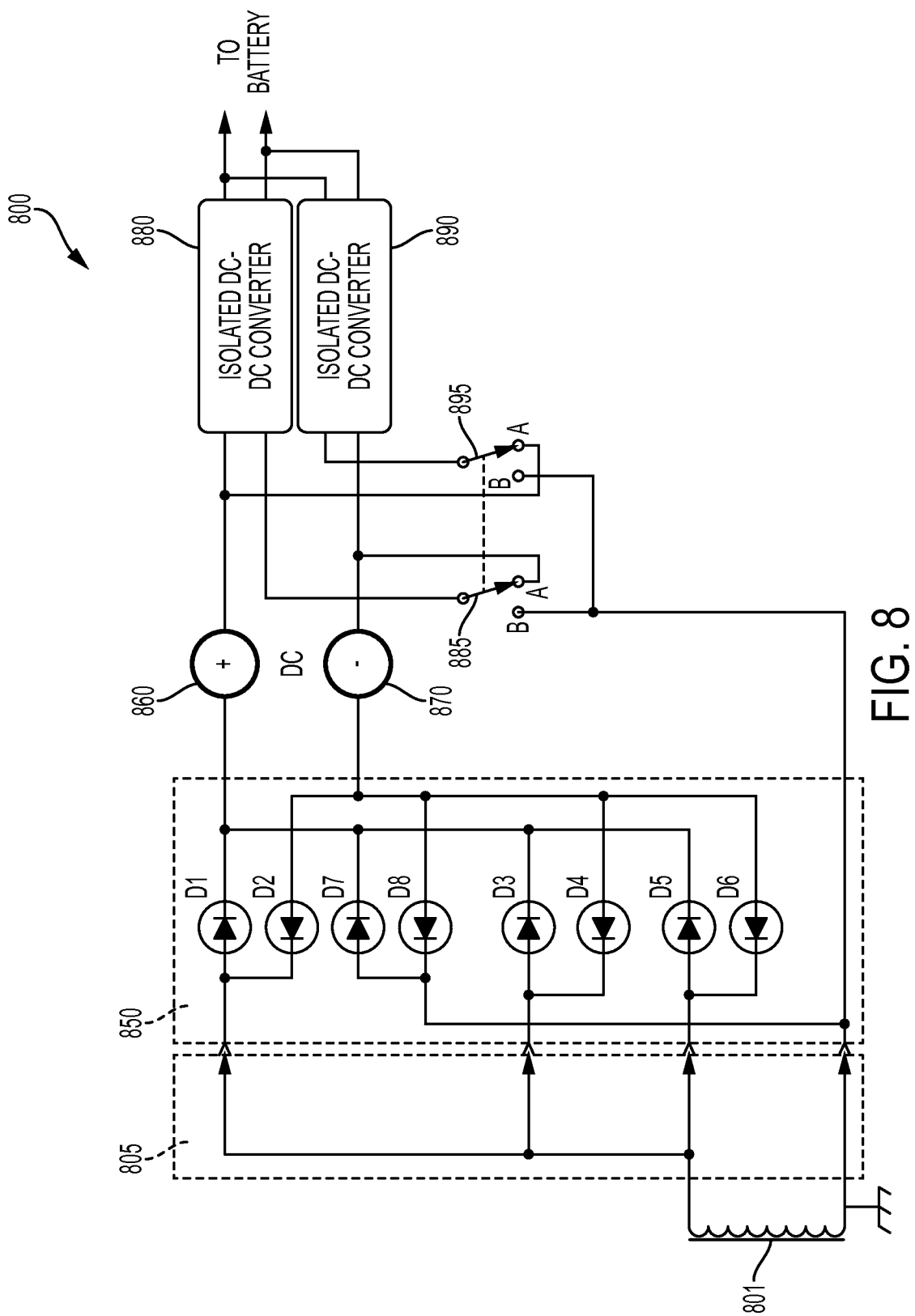
FIG. 8 illustrates a charging system for a single phase grid supply of medium voltage in accordance with exemplary embodiments.

Exemplary embodiments may also be implemented for a single phase supply voltage. An exemplary implementation for single phase supply voltage is illustrated in FIG. 8. Charging device 800 may be connected to a single-phase supply voltage 801 via adapter 805. Supply voltage 801 may be a single-phase grid supply of 240 VAC. For the single phase implementation, switches 885 and 895 may be set at the "A" position (i.e. the low voltage setting of FIG. 7). Diodes D7 and D8 provide flexibility in a single phase setting to accommodate input power from line to line (not shown), or from line to neutral as illustrated in FIG. 4 and in FIG. 8.

The supply voltage of 240 VAC RMS is input to full wave rectifier 650. The voltage output from rectifier 650 may be approximately 216 VDC Average which results from ((240*2*√2)/π) or approximately 339.4 VDC Peak (240*√2). Therefore, the 240 VAC single-phase input generates about 58% of the power compared to a 480/277 VAC three-phase input. While the three phase case shows improvement over prior art, this 58% single-phase case is not as good as the 87% achieved in the specific single phase (only) implementation of FIG. 4.

An exemplary charging device, such as the charger illustrated in FIG. 7, may be connected to a vehicle battery and may be implemented within the vehicle. The charger may be connected to the supply voltage. In some embodiments, a sensor may also be included in the charging device to determine the supply voltage type such as a single phase, a three phase high (480/277) or a three phase low (208/120). The switch position can be adjusted based on the supply voltage detected by the sensor.

In some embodiments, a user or operator of the vehicle can switch between the positions based on the user's determination of the type of supply voltage available. In some embodiments, the charging device may be set to a particular setting (such as single phase, three phase low or three phase high) based on user or customer specifications.

Figure 9:
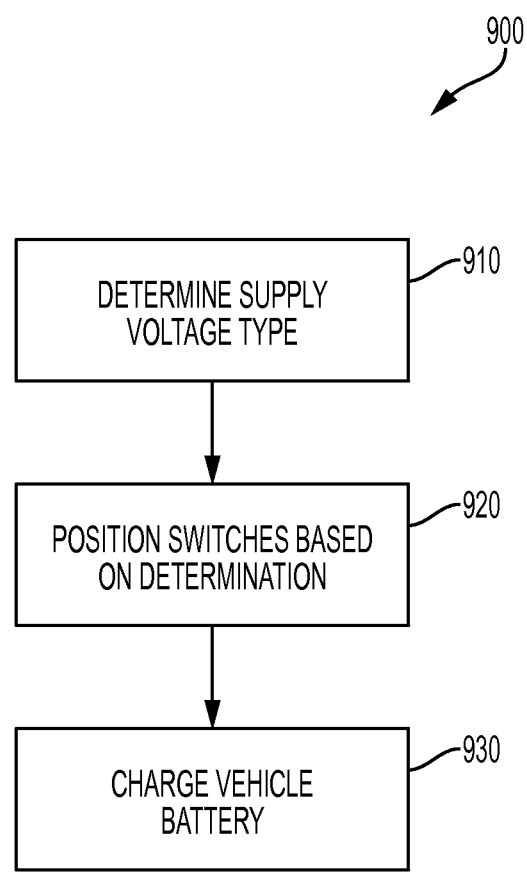
FIG. 9 illustrates a method in accordance with exemplary embodiments.

A method in accordance with exemplary embodiments may be described with reference to FIG. 9. In method 900, a supply voltage may be determined at step 910. Switches (such as switches 780 and 790 of FIG. 7) may be positioned at step 920 in accordance with the determination. The vehicle battery may be charged at 930.

Exemplary embodiments as disclosed herein facilitate multiple applications using one device. A first application may be wired with the configuration of FIG. 5 when only a low voltage three phase supply is expected. A second application may be wired with the configuration of FIG. 6 when only a high voltage three phase supply is expected. A third application may use the switchable configuration of FIG. 7 when flexibility between a high and low voltage three phase supply is expected or needed.

A fourth application may use the configuration of FIG. 8 when a single phase supply is expected. Currently, tens of thousands of single phase charging outlets are available throughout the United States. A charging device in accordance with exemplary embodiments can be used to provide backward compatibility with existing single phase charging outlets.

Backwards compatibility consists of good performance with 240 VAC single phase input as well as flexibility in input connection topology. Existing solutions might require 240 VAC single phase inputs to be connected between phase 1 and phase 2 for example, whereas connection between phase 1 and neutral might be more advantageous in some circumstances.

Exemplary embodiments as described above may be implemented in a variety of applications related to charging batteries of vehicles. The vehicles may include, but are not limited to, trucks, buses, automobiles, boats, ferries, hovercraft, all terrain vehicles (ATVs), motorized bicycles/tricycles/skateboards, cranes in shipping ports, trams, airport vehicles, etc.

Although exemplary embodiments have been disclosed, it will be apparent to those skilled in the art that various changes and modifications can be made which will achieve some of the advantages of embodiments without departing from the spirit and scope of the disclosure. Such modifications are intended to be covered by the appended claims in which the reference signs shall not be construed as limiting the scope.

In the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system for charging a battery from a three phase grid supply AC voltage wherein the grid supply supplies varying voltage levels, the system comprising:
   a full wave bridge rectifier receiving the AC supply voltage and outputting unregulated DC voltage;
   two DC to DC converters receiving the unregulated DC voltage from the rectifier;
   a first switch connected to a first input line of a first one of the two DC to DC converters; and
   a second switch connected to a first input line of a second one of the two DC to DC converters, wherein the switches are set to a first position when the supply voltage is at a lower one of the varying voltage levels, and to a second position when the supply voltage is at a higher one of the varying voltage level;
   wherein a second input line of the first converter of the pair of DC to DC converters is connected to a positive voltage output of the rectifier and the second input line of the second converter of the pair of DC to DC converters is connected to a negative voltage output of the rectifier; and
   wherein when each of the switches is set to the second position, the first input line of each of the two DC to DC converters is connected to a neutral line of the phase grid supply via the respective switch.

2. The system of claim 1, wherein when each of the switches is set to the first position, the first input line of the first converter of the pair of DC to DC converters is connected to the negative voltage output of the rectifier and the first input line of the second converter of the pair of DC to DC converters is connected to the positive voltage output of the rectifier.

3. The system of claim 1, wherein the higher voltage level corresponds to a three phase supply voltage of 480 Δ/277 Wye VAC.

4. The system of claim 3, wherein an average voltage output value from the rectifier is approximately ±374.1 VDC with respect to neutral.

5. The system of claim 4, wherein the average voltage value input to the converters is 374.1 VDC.

6. The system of claim 1, wherein the lower voltage level corresponds to a supply voltage of 208 Δ/120 Wye VAC.

7. The system of claim 6, wherein an average voltage output value from the rectifier is approximately ±162 VDC with respect to neutral.

8. The system of claim 7, wherein the average voltage value input to the converters is 324 VDC.

9. A method for charging an electric vehicle battery from a three phase grid supply AC voltage having a varying voltage level, the method comprising the steps of:
   determining a type of available supply voltage;
   positioning a pair of switches in one of two positions in accordance with the determined supply voltage; and
   charging the vehicle battery using the available supply voltage, wherein:
   the switches are each connected to a respective first input line of a pair of DC to DC converters that receive unregulated DC voltage from a full wave bridge rectifier, the rectifier being supplied with varying grid AC voltages;
   the switches are in a first position when the supply voltage is at a lower one of the varying voltage levels and in a second position when the supply voltage is at a higher one of the varying voltage levels;
   the type of available voltage is one of three-phase grid supply AC voltage and a single-phase grid supply AC voltage;
   a second input line of a first converter of the pair of DC to DC converters is connected to a positive voltage output of the rectifier and a second input line of a second converter of the pair of DC to DC converters is connected to a negative voltage output of the rectifier; and
   when each of the switches is set to the second position, the first input line of each of the pair of DC to DC converters is connected to a neutral line of the phase grid supply via the respective switch.

10. The method of claim 9, wherein the three phase grid supply voltage is one of 480/277 VAC and 208/120 VAC.

11. The method of claim 9, wherein the single phase grid supply voltage is 240 VAC.

* * * * *